US006214428B1

(12) United States Patent
Henderson

(10) Patent No.: US 6,214,428 B1
(45) Date of Patent: Apr. 10, 2001

(54) LAMINATED SUPPORT MAT

(76) Inventor: Kenneth E. Henderson, P.O. Box 46, French Camp, MS (US) 39745

( * ) Notice: Subject to any disclaimer, the term of this patent is extended or adjusted under 35 U.S.C. 154(b) by 0 days.

(21) Appl. No.: 09/309,380

(22) Filed: May 10, 1999

Related U.S. Application Data

(60) Provisional application No. 60/085,400, filed on May 14, 1998.

(51) Int. Cl.[7] ........................................ B32B 3/10

(52) U.S. Cl. ................................ 428/54; 428/58; 52/177; 238/14

(58) Field of Search .......................... 428/54, 58; 52/177; 404/35, 46; 238/14

(56) References Cited

U.S. PATENT DOCUMENTS 5,985,398 * 11/1999 BelleGarde ............................ 428/54

* cited by examiner

*Primary Examiner*—Alexander S. Thomas
(74) *Attorney, Agent, or Firm*—John M Harrison

(57) ABSTRACT

A laminated support mat for supporting and moving draglines and other heavy equipment in muddy, boggy or marshy areas. The laminated support mat includes multiple wooden laminates of typically unequal length and selected width and thickness, which laminates may be fitted with one or more wear mat or pad and are bolted together to define a support mat of desired dimension, the laminates preferably constructed of oak wood for good strength and durability. The laminates may be constructed of scrap wood and conventional cable loops may be provided on each end of the laminated support mat for locating the mat in a desired position. Where the typically rubber wear pad or pads are used, the pads may be mounted on the laminates using a pair of channels that receive the bolts securing the laminates together.

18 Claims, 2 Drawing Sheets

LAMINATED SUPPORT MAT

CROSS-REFERENCE TO RELATED APPLICATIONS

This application claims the benefit of U.S. Provisional Application Serial No. 60/085,400, filed May 14, 1998, now abandoned.

BACKGROUND OF THE INVENTION

1. Field of the Invention

This invention relates to support mats for placement over muddy, boggy and marshy areas for supporting and moving heavy equipment and more particularly, to a laminated support mat which is constructed of multiple laminates of unequal length and selected width and thickness, bolted together and fitted with conventional cables at each end for positioning purposes. One or more wear mats or pads may be bolted to the laminates by means of channels to lengthen the service life of the support mats.

One of the problems which exists in accessing remote locations, typically for such activities as drilling oil and gas wells, is that of moving heavy equipment through sometimes muddy, boggy and marshy areas and supporting the equipment in these areas. Various techniques are known in the art for achieving this end. These techniques include the laying of log or timber roads which tend to become impassable over time because of the tendency of the individual logs or timbers to separate and bend, thus leaving holes, irregular areas and openings in which the heavy equipment tracks or tires may bog down. Other attempts to provide a more stable roadway into and over these relatively inaccessible areas is the use of mats or pallets which are typically constructed of eight-inch by twelve-inch by 24-foot planks or lumber and are typically fitted with cable loops at each end for engagement by backhoes or other equipment and positioning the mats or pallets in adjacent relationship over the muddy, boggy or marshy terrain to form the roadway. The individual planks or boards in the support mats or pallets are typically joined by bolts secured by nuts and may include the cable loops at each end for placement of the mats in a desired position. A primary problem with the construction of these mats is the necessity of locating oak timber of suitable size. For example, provision of four-to-five, eight by twelve by twenty-four foot oak planks requires a considerable supply of oak saw logs, which may be in short supply in the area. Oak is the traditional wood of choice, since it is well known for its density, strength and durability.

Accordingly, it is an object of this invention to provide a laminated scrap wood support mat for supporting heavy equipment such as draglines, in reaching relatively inaccessible areas over boggy, marshy or muddy terrain.

Another object of the invention is to provide a laminated support mat which is constructed of multiple dense, hardwood laminates of typically unequal length and selected width and thickness, joined by bolts to define a mat or pallet which is suitable for traversing by a dragline and other heavy equipment to access relatively inaccessible marshy, muddy or boggy areas.

Still another object of the invention is to provide a laminated support mat or pallet constructed of multiple oak laminates of various size and length and butted end-to-end and side-by-side and having at least one wear mat or pad on one or both bearing surfaces, to configure a support mat or pallet of desired size and shape for placement over boggy, marshy or muddy terrain to support and move heavy equipment such as draglines, in accessing a desired location.

A still further object of this invention is to provide a laminated support mat of desired dimensions and proportions, which support mat includes multiple oak laminates of different length and selected width and thickness, which laminates are bolted together and typically include one or more wear pads, to define a padded support mat or pallet for placement over marshy, boggy or muddy terrain and supporting and moving draglines and other heavy equipment to access oil field sites, construction areas and other relatively inaccessible locations.

2. Summary of the Invention

These and other objects of the invention are provided in a laminated support mat or pallet constructed of dense hardwood such as oak slats, strips or planks, typically of unequal length and selected width and thickness, cable loops attached to the mat ends for handling purposes, a pair of spaced-apart wear pads attached to one or both contact sides of the laminates by means of metal channels and further including bolts extending through the channels and the laminates for binding the laminates together and securing the wear pads, to define a laminated, padded support mat for placement over boggy, marshy or muddy terrain and supporting heavy equipment such as draglines for accessing relatively inaccessible areas.

BRIEF DESCRIPTIONS OF THE DRAWINGS

The invention will be better understood by reference to the accompanying drawings, wherein.

DESCRIPTION OF THE PREFERRED EMBODIMENTS

Figure 1:
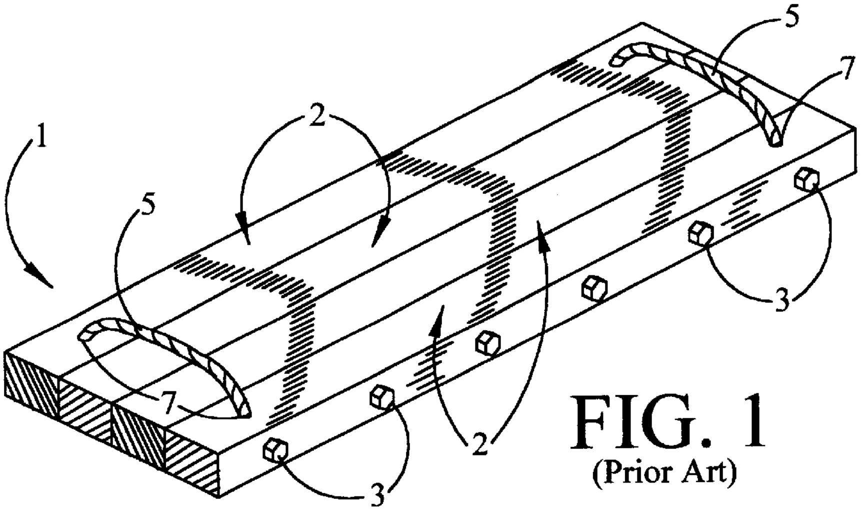
FIG. 1 (Prior Art)
FIG. 1 is a perspective view of a conventional equipment support mat constructed of large hardwood planks or boards.

Referring initially to FIG. 1 of the drawings, a conventional mat for supporting heavy equipment such as draglines and the like, is generally illustrated by reference numeral 1. The conventional mat 1 includes several large mat boards or planks 2, which are typically eight inches thick by twelve inches wide by twenty-four feet in length and are transversely joined by spaced-apart tie bolts 3 and corresponding nuts (not illustrated). As illustrated, in a typical construction of the conventional mat 1, four such mat boards 2 are utilized and are joined in side-by-side relationship by means of the tie bolts 3 and nuts, to define the mat 1. A pair of cable loops 5 are typically extended through cable openings 7, typically drilled in the outside ones of the mount boards 2 at each end of the conventional mat 1, as further illustrated in FIG. 1 and the cable loops 5 are typically secured in place by means of one or more cable stays or clamps 6, as illustrated in FIG. 3.

It will be appreciated from a consideration of the conventional mat 1 illustrated in FIG. 1 that construction of the conventional mat 1 requires very large mat planks or boards 2, typically having dimensions of eight inches thick by twelve inches wide by twenty-four feet in length. These dimensions require hardwood or oak saw logs of considerable size for construction of the mat boards 2. In many locations where conventional mats 1 are necessary in order to access muddy, boggy or marshy drilling, construction or alternative locations, such hard wood saw logs are in short supply and it is difficult to obtain the conventional mats 1 having mat boards 2 of the indicated size.

Figure 2:
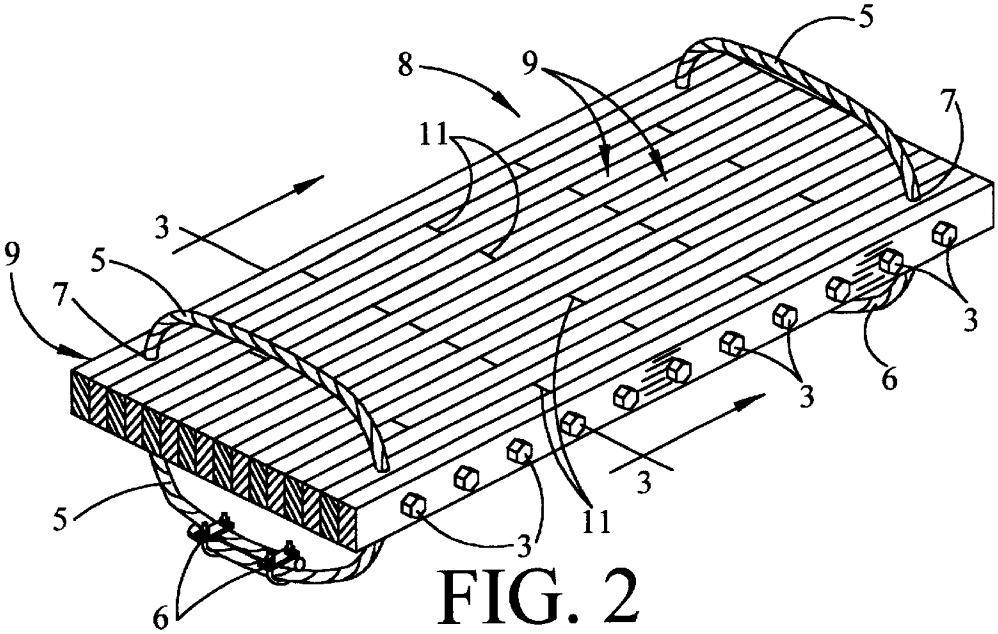
FIG. 2 is a perspective view of a preferred embodiment of the laminated support mat of this invention.
Figure 3:
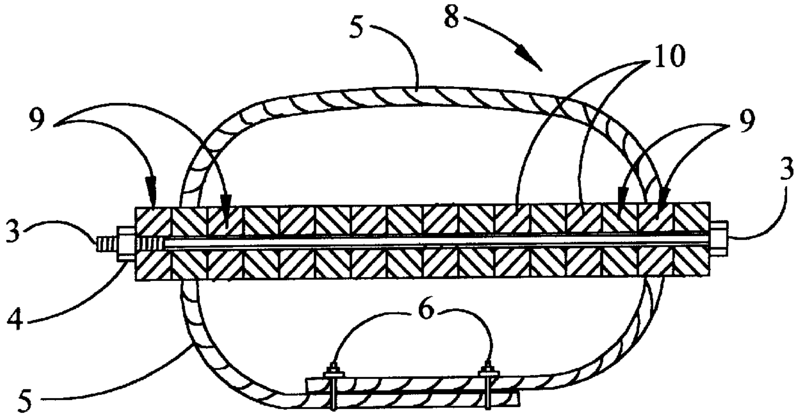
FIG. 3 is a transverse sectional view taken along line 3—3 of the laminated support mat illustrated in FIG. 2.

Referring now to FIGS. 2 and 3 of the drawings, in a preferred embodiment of this invention a laminated support mat is generally illustrated by reference numeral 8 and includes multiple laminate segments 9 of any desired size and typically unequal length and preferably constructed of hardwood such as oak, having good strength and durability. The laminate segments 9 are positioned end-to-end and side-by-side to define a laminated support mat 8 of desired dimensions, typically the same length of twenty-four feet, as in the case of the conventional mat 1 illustrated in FIG. 1 and four feet in width. However, the length of the laminated support mat 8 may vary, and is typically 12, 18, 20 or 24 feet, or longer, as deemed necessary. The respective segment ends 10 of the respective laminate segments 9 of various size may be butted together to define end joints 11 and the laminate segments 9 are typically joined by means of tie bolts 3 and nuts 4 in the same manner as the conventional mat 1 illustrated in FIG. 1. Alternatively, the laminate segments 9 may be joined by other fasteners such as lag bolts (not illustrated) which extend through the laminate segments 9 illustrated in FIG. 2. Some of the laminate segments 9 may extend the entire length of the laminated support mat 8, as desired.

Figure 4:
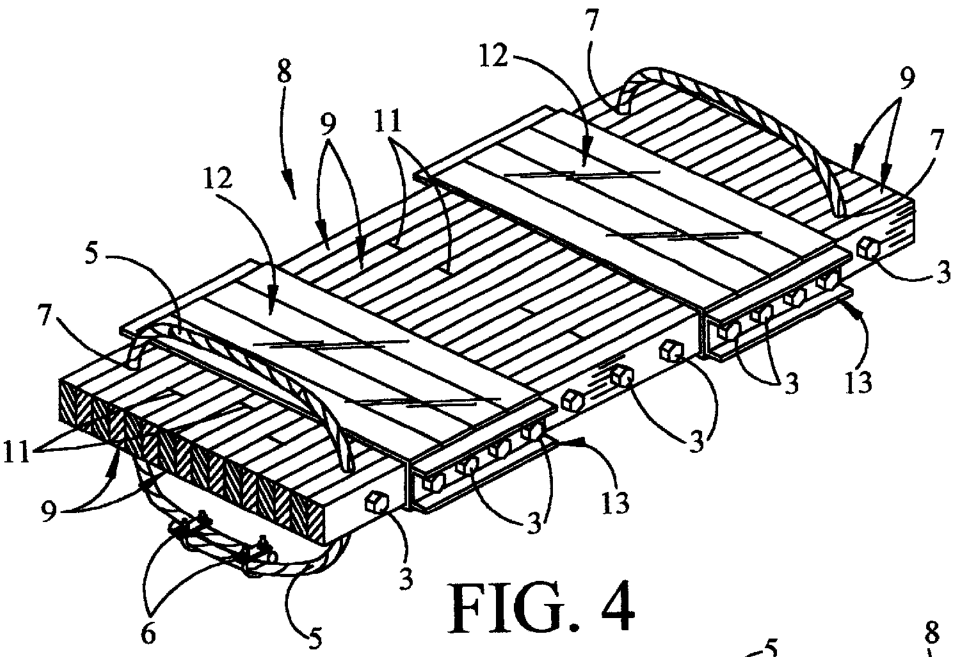
FIG. 4 is a perspective view of an alternative padded laminated support mat.
Figure 5:
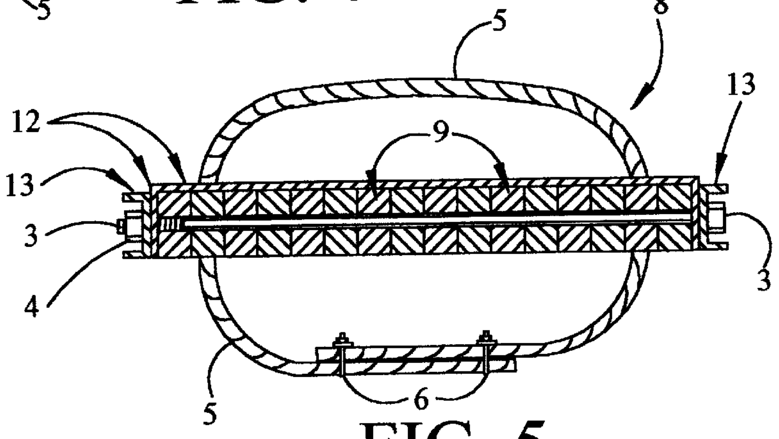
FIG. 5 is a transverse sectional view of the laminated support mat illustrated in FIG. 4, with padding on one contact side.
Figure 6:
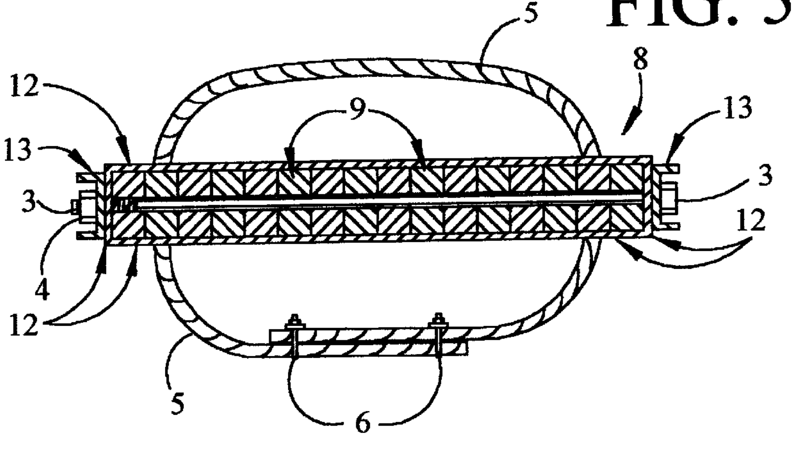
FIG. 6 is a transverse sectional view of the laminated support mat illustrated in FIG. 4, with padding on both contact sides.

As illustrated in FIGS. 4–6 of the drawings the laminated support mat 8 may be fitted with one or a pair of wear pads 12, secured in place on the laminate segments 9 by parallel channels 13, that receive some of the tie bolts 3 and securing nuts 4. Alternatively, the wear pad or pads 12 may extend across both bearing or contact surfaces of the laminate segments 9, as illustrated in FIG. 6. The wear pads 12 are typically constructed of rubber such as split tires and are designed to increase the wear characteristics of the bearing or contact surfaces of the laminate segments 9.

It will be appreciated from a consideration of FIGS. 2–6 of the drawings, and as heretofore described, that the respective laminate segments 9 can be of substantially any desired length, width and thickness consistent with the load requirements of the equipment which the laminated support mat 8 must bear. Accordingly, it is much easier and less expensive to provide the much shorter laminate segments 9 for construction and assembly into a laminated support mat 8 of selected length, thickness and width, than it is to locate the large timbers, boards or planks 2 required for construction of the conventional mat 1 illustrated in FIG. 1. Furthermore, since these laminate segments 9 are typically connected by means of fasteners such as the respective tie bolts 3 and nuts 4 in the same manner as the conventional mat 1 illustrated in FIG. 1, the laminated support mat 8 of this invention is at least as strong as the conventional mat boards 2 and can be utilized in substantially any of the applications in which the conventional mat 1 is used, to support heavy equipment while the equipment is traversing marshy, muddy and boggy areas adjacent to various drilling, construction or alternative sites. Moreover, bolting of the typically rubber wear pads 12 on the laminated support mat 8 by means of the channels 13, typically in two segments as illustrated in FIG. 4, greatly increases the longevity of the laminated support mat 8, particularly when the wear pads 12 are secured on both sides of the laminate segments 9, as illustrated in FIG. 6.

It will be further appreciated by those skilled in the art that the laminated support mat 8 can be constructed of substantially any kind of lumber, including scrap lumber of various length, width and thickness, as desired. However, in a most preferred embodiment of the invention the laminate segments 9 which shape the laminated support mat 8 illustrated in FIGS. 2–6 are constructed of oak lumber for optimum strength and durability.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A laminated support mat comprising a plurality of laminates assembled into a desired configuration to define said mat, said mat having first and second contact surfaces; a plurality of bolts extending through said laminates for maintaining said laminates in said configuration; and at least one wear pad provided on said laminates for protecting said laminates from abrasion, said at least one wear pad extending across said first contact surface and said second contact surface of said mat.

2. The laminated support mat of claim 1 wherein said laminates are wood.

3. The laminated support mat of claim 1 wherein at least some of said laminates are of different length.

4. The laminated support mat of claim 3 wherein said laminates are wood.

5. The laminated support mat of claim 1 comprising a cable loop provided at each end of said laminates for handling said mat.

6. The laminated support mat of claim 5 wherein all of said laminates are of different lengths.

7. The laminated support mat of claim 1 wherein said at least one wear pad comprises a plurality of wear pads.

8. The laminated support mat of claim 7 wherein all of said laminates are of different length.

9. A laminated support mat for placement on soft terrain and supporting equipment, comprising a plurality of laminates arranged in end-to-end and side-by-side relationship to define said support mat; at least one rubber pad provided on said laminates for protecting said laminates from abrasion; and a plurality of bolts extending through said rubber pad and said laminates in spaced-apart relationship with respect to each other and nuts threaded on said bolts, respectively, for securing said rubber pad on said laminates and securing said laminates together.

10. The laminated support mat of claim 9 wherein said laminates are wood.

11. The laminated support mat of claim 10 wherein at least some of said laminates are of dissimilar length.

12. The laminated support mat of claim 9 wherein said at least one rubber pad comprises a plurality of rubber pads.

13. The laminated support mat of claim 12 comprising a cable loop provided at each end of said laminates for handling said mat.

14. The laminated support mat of claim 13 wherein at least some of said laminates are of dissimilar length.

15. The laminated support mat of claim 14 wherein said laminates are wood.

16. A laminated support mat for placement on soft terrain and supporting equipment, comprising a plurality of laminates arranged in end-to-end and side-by-side relationship to define said support mat; at least one pair of rubber pads provided in spaced-apart relationship with respect to each other on said laminates for protecting said laminates from abrasion; at least one pair of channels engaging each of said rubber pads; and a plurality of bolts extending through said channels, said rubber pads and said laminates in spaced-apart relationship with respect to each other and nuts threaded on said bolts, respectively, for securing said rubber pads on said laminates and securing said laminates together.

17. The laminated support mat of claim 16 wherein said laminates are wood and comprising a cable loop provided at each end of said laminates for handling said mat.

18. The laminated support mat of claim 17 wherein at least some of said laminates are of dissimilar length.

* * * * *